(12) United States Patent
Zhang et al.

(10) Patent No.: US 12,488,575 B2
(45) Date of Patent: Dec. 2, 2025

(54) METHOD AND SYSTEM OF VERIFYING AUTHENTICITY OF DECLARATION INFORMATION, DEVICE AND MEDIUM

(71) Applicants: NUCTECH COMPANY LIMITED, Beijing (CN); Tsinghua University, Beijing (CN)

(72) Inventors: Li Zhang, Beijing (CN); Yuxiang Xing, Beijing (CN); Hu Tang, Beijing (CN); Yunda Sun, Beijing (CN); Gang Fu, Beijing (CN); Qiang Li, Beijing (CN); Yan Zhang, Beijing (CN); Wubin Wu, Beijing (CN)

(73) Assignees: NUCTECH COMPANY LIMITED, Beijing (CN); Tsinghua University, Beijing (CN)

( * ) Notice: Subject to any disclaimer, the term of this patent is extended or adjusted under 35 U.S.C. 154(b) by 468 days.

(21) Appl. No.: 17/980,831

(22) Filed: Nov. 4, 2022

(65) Prior Publication Data
US 2023/0144433 A1    May 11, 2023

(30) Foreign Application Priority Data
Nov. 5, 2021    (CN) .......................... 202111310339.8

(51) Int. Cl.
*G06V 10/80*    (2022.01)
*G06F 40/295*    (2020.01)
(Continued)

(52) U.S. Cl.
CPC .......... *G06V 10/806* (2022.01); *G06F 40/295* (2020.01); *G06V 10/26* (2022.01); *G06V 10/82* (2022.01); *G06V 20/62* (2022.01)

(58) Field of Classification Search
CPC ...... G06V 10/806; G06V 10/26; G06V 10/82; G06V 20/62; G06V 20/60; G06V 30/413;
(Continued)

(56) References Cited

U.S. PATENT DOCUMENTS

| | | | |
|---|---|---|---|
| 2019/0385073 A1* | 12/2019 | Guo | G06F 18/24 |
| 2020/0051017 A1* | 2/2020 | Dujmic | G06V 20/52 |
| 2022/0121839 A1* | 4/2022 | Tagra | G06V 40/172 |

* cited by examiner

*Primary Examiner* — Jianxun Yang
(74) *Attorney, Agent, or Firm* — Merchant & Gould P.C.

(57) ABSTRACT

Provided is a method of verifying an authenticity of declaration information. The method includes: acquiring a machine-detected radiation image obtained by scanning a container loaded with an article; acquiring a declaration information for declaring the article in the container; performing an identification on an image information of the article in the machine-detected radiation image to obtain an image feature corresponding to the machine-detected radiation image; performing an identification on a text information of the article in the declaration information to obtain a text feature corresponding to the declaration information; screening a declaration category of the article in the container by taking the image feature as an input information and the text feature as an external introduction feature; and determining that the declaration information is in doubt when a declaration category of at least one article in the container does not belong to a declaration category in the declaration information.

15 Claims, 8 Drawing Sheets

(51) Int. Cl.
  *G06V 10/26* (2022.01)
  *G06V 10/82* (2022.01)
  *G06V 20/62* (2022.01)
(58) Field of Classification Search
  CPC .... G06F 40/295; G06F 18/253; G06F 18/256; G06N 3/0455; G06N 3/0464; G06N 3/0475; G06N 3/08; G01N 2223/401; G01N 2223/639; G01N 2223/643; G01N 23/04
  See application file for complete search history.

METHOD AND SYSTEM OF VERIFYING AUTHENTICITY OF DECLARATION INFORMATION, DEVICE AND MEDIUM

CROSS-REFERENCE TO RELATED APPLICATION

This application claims the priority of Chinese Patent Application No. 202111310339.8 filed on Nov. 5, 2021 in the China National Intellectual Property Administration, the content of which is incorporated herein by reference in entirety.

TECHNICAL FIELD

The present disclosure relates to a field of artificial intelligence technology, and in particular, to a method of verifying an authenticity of declaration information, an apparatus, a device and a medium.

BACKGROUND

In material transportation or delivery links such as customs, air transportation, logistics and the like, it is often necessary to check whether the materials declared by a declarant are actually consistent with the materials actually transported, so as to prevent smuggling and the like. However, articles are usually packed in sealed containers such as a container during transportation, and are difficult to be observed, which will bring great inconvenience to an inspection process.

There are two main types of existing inspection methods: one is to unpack the articles one by one, and verify the name, specification model, quantity, weight, and origin information of the articles one by one, but this will consume a lot of manpower; the other is to carry out spot check and verify customs declaration information according to a certain proportion, but it is difficult to "unpack the articles one by one" and may miss the inspection of key information. In order to improve an efficiency of customs clearance, there is a method of inspecting by introducing an X-ray detection device in the prior art.

In a process of realizing an inventive concept of the present disclosure, the inventor found that there are at least following problems in the prior art: when scanning articles for inspection through an X-ray detection device, since the articles under a same declaration category (for example, a declared tax number category, a commodity number in a customs declaration form) may include many goods with different names and specification models, the performance of these articles on a X-ray image (hereinafter referred to as a machine-detected radiation image) is quite different, which increases a difficulty of inspection. In addition, in customs and other services, there are often cases of consolidation of containers, consolidation of orders, or mixed packing of goods of different categories or names, which will lead to a fact that a declaration form and a container are not a simple one-to-one mapping relationship. Hence, inspection by the machine-detected radiation image alone will lead to a large number of complex situations where names, specification models and images may not be matched, bringing great difficulties to the accuracy and convenience of the inspection work.

SUMMARY

In view of above, embodiments of the present disclosure provides a method of verifying an authenticity of declaration information, an apparatus, a device and a medium, which combine a machine-detected radiation image and a declaration information for intelligent inspection.

According to an aspect of embodiments of the present disclosure, there is provided a method of verifying an authenticity of declaration information. The method includes: acquiring a machine-detected radiation image obtained by scanning a container loaded with an article; acquiring a declaration information for declaring the article in the container; performing an identification on an image information of the article in the machine-detected radiation image to obtain an image feature corresponding to the machine-detected radiation image; performing an identification on a text information of the article in the declaration information to obtain a text feature corresponding to the declaration information, wherein the text feature is configured to represent a declaration category to which the article in the declaration information belongs; screening a declaration category of the article in the container by taking the image feature as an input information and the text feature as an external introduction feature; and determining that the declaration information is in doubt when a declaration category of at least one article in the container does not belong to a declaration category in the declaration information.

According to embodiments of the present disclosure, the image feature includes N1 first image feature vectors corresponding to image information of N1 articles in the machine-detected radiation image, respectively, wherein N1 is an integer greater than or equal to 1.

According to embodiments of the present disclosure, wherein the performing an identification on an image information of the article in the machine-detected radiation image to obtain an image feature corresponding to the machine-detected radiation image includes: dividing different articles in the machine-detected radiation image into independent image blocks by using a target detection algorithm to obtain N1 image blocks; extracting a second image feature vector corresponding to each of the image blocks; and obtaining, based on the second image feature vector corresponding to each of the image blocks, the first image feature vector corresponding to the image information of the article represented by the image block.

According to embodiments of the present disclosure, the extracting a second image feature vector corresponding to each of the image blocks includes: performing an image identification on each of the image blocks by using an image feature extraction module to obtain the second image feature vector corresponding to each of the image blocks, wherein the image feature extraction module includes a convolution neural network.

According to embodiments of the present disclosure, the image feature extraction module includes a network structure taking resnet as a basic network and adding SE-block after a resnet pooling layer.

According to embodiments of the present disclosure, the obtaining the first image feature vector corresponding to the image information of the article represented by the image block based on the second image feature vector corresponding to each of the image blocks includes: acquiring a position information of each of the image blocks in the machine-detected radiation image; and obtaining the first image feature vector based on the second image feature vector and the position information corresponding to a same image block.

According to embodiments of the present disclosure, the obtaining the first image feature vector based on the second image feature vector and the position information corresponding to a same image block includes: processing the second image feature vector using the position information of the image block; inputting the processed second image feature vector into an encoder; and obtaining an output of the encoder to obtain the first image feature vector corresponding to the image block.

According to embodiments of the present disclosure, the screening a declaration category of the article in the container by taking the image feature as an input information and the text feature as an external introduction feature includes: screening the declaration category of the article in the container using a cross-modal decoder by taking the image feature as an input information of the cross-modal decoder and the text feature as an external introduction feature of an attention mechanism of the cross-modal decoder.

According to embodiments of the present disclosure, the encoder and the cross-modal decoder are jointly trained.

According to embodiments of the present disclosure, the encoder adopts a transformer encoder model.

According to embodiments of the present disclosure, the cross-modal decoder adopts a transformer decoder model.

According to embodiments of the present disclosure, the text feature includes text feature vectors corresponding to N2 articles in the declaration information, respectively, wherein N2 is an integer greater than or equal to 1.

According to embodiments of the present disclosure, the performing an identification on a text information of the article in the declaration information to obtain a text feature corresponding to the declaration information includes: extracting a name information and a specification model information of each article in the declaration information; for each article, processing the name information into a first statement, and processing the specification model information into a second statement; determining the first statement and the second statement corresponding to a same article as an input of a text feature extraction projection module, and classifying the declaration category to which the article belongs using the text feature extraction projection module; and determining an output result of the text feature extraction projection module for each article category as the text feature vector corresponding to the article; wherein, N2 text feature vectors are correspondingly obtained for N2 articles.

According to embodiments of the present disclosure, the text feature extraction projection module adopts a BERT model.

According to a second aspect of embodiments of the present disclosure, there is provided a system of verifying an authenticity of declaration information, including: an information acquisition subsystem configured to acquire a machine-detected radiation image obtained by scanning a container loaded with an article, and acquire a declaration information for declaring the article in the container; a feature extraction subsystem configured to perform an identification on an image information of the article in the machine-detected radiation image to obtain an image feature corresponding to the machine-detected radiation image, and perform an identification on a text information of the article in the declaration information to obtain a text feature corresponding to the declaration information, wherein the text feature is configured to represent a declaration category to which the article in the declaration information belongs; a feature fusion subsystem configured to screen a declaration category of the article in the container by taking the image feature as an input information and the text feature as an external introduction feature; and a conclusion determination subsystem configured to determine that the declaration information is in doubt when a declaration category of at least one article in the container does not belong to a declaration category in the declaration information.

According to embodiments of the present disclosure, the image feature includes N1 first image feature vectors corresponding to image information of N1 articles in the machine-detected radiation image, respectively, wherein N1 is an integer greater than or equal to 1. According to embodiments of the present disclosure, the feature extraction subsystem includes: an image preprocessing module configured to divide different articles in the machine-detected radiation image into independent image blocks by using a target detection algorithm to obtain N1 image blocks; an image feature extraction module configured to extract a second image feature vector corresponding to each of the image blocks; and an image feature mapping module configured to obtain the first image feature vector corresponding to the image information of the article represented by the image block based on the second image feature vector corresponding to each of the image blocks.

According to embodiments of the present disclosure, the text feature includes text feature vectors corresponding to N2 articles in the declaration information, respectively, wherein N2 is an integer greater than or equal to 1. According to embodiments of the present disclosure, the feature extraction subsystem includes: a declaration information preprocessing module configured to extract a name information and a specification model information of each article in the declaration information; and for each article, process the name information into a first statement, and process the specification model information into a second statement; and a text feature extraction projection module configured to determine the first statement and the second statement corresponding to a same article as an input, and classify the declaration category to which the article belongs; and determine an output result of the text feature extraction projection module for each article category as the text feature vector corresponding to the article; wherein, N2 text feature vectors are correspondingly obtained for N2 articles.

According to another aspect of embodiments of the present disclosure, there is provided an electronic device including one or more memories storing executable instructions; and one or more processors performing the executable instructions to implement the method described above.

According to another aspect of embodiments of the present disclosure, there is provided a computer readable storage medium having stored thereon computer executable instructions, wherein the instructions, when executed, are configured to implement the method described above.

According to another aspect of embodiments of the present disclosure, there is provided a computer program containing computer executable instructions, wherein the instructions, when executed, are configured to implement the method described above.

BRIEF DESCRIPTION OF THE DRAWINGS

The above and other objectives, features and advantages of the present disclosure will be more apparent through the following description of embodiments of the present disclosure with reference to the accompanying drawings.

DETAILED DESCRIPTION OF EMBODIMENTS

Embodiments of the present disclosure will be described below with reference to the accompanying drawings. It should be understood, however, that these descriptions are merely exemplary and are not intended to limit the scope of the present disclosure. In the following detailed descriptions, for purposes of explanation, numerous specific details are set forth in order to provide a thorough understanding of the embodiments of the present disclosure. It is obvious, however, that one or more embodiments may be implemented without these specific details. In addition, in the following description, descriptions of well-known structures and technologies are omitted to avoid unnecessarily obscuring the concepts of the present disclosure.

In the present disclosure, it should be understood that any number of elements in the description and the drawings are to be regarded in an illustrative rather than a restrictive sense, and that any nomenclature (e.g., first, second) is used for distinction only and not in any restrictive sense.

In order to effectively verify whether a article packaged in a container is consistent with a declaration information, embodiments of the present disclosure provides a method and a system of verifying an authenticity of declaration information, a device, a medium and a program product, which combine the declaration information in a text form and a machine-detected radiation image, fuse an image feature and a declaration information text feature by using a cross-modal fusion device based on an attention mechanism, realize intelligent inspection on clearance articles, and determine whether there is any false declaration.

Specifically, embodiments of the present disclosure provide a method and a system of verifying an authenticity of declaration information, a device, and a medium. The method includes the following steps: first, acquiring a machine-detected radiation image obtained by scanning a container loaded with an article, and acquiring a declaration information for declaring the article in the container; then performing an identification on an image information of the article in the machine-detected radiation image to obtain an image feature corresponding to the machine-detected radiation image, and performing an identification on a text information of the article in the declaration information to obtain a text feature corresponding to the declaration information, wherein the text feature is used for representing a declaration category to which the article in the declaration information belongs; next, screening a declaration category of the article in the container by taking the image feature as an input information and the text feature as an external introduction feature, and determining that the declaration information is in doubt when a declaration category of at least one article in the container does not belong to a declaration category in the declaration information.

Figure 1:
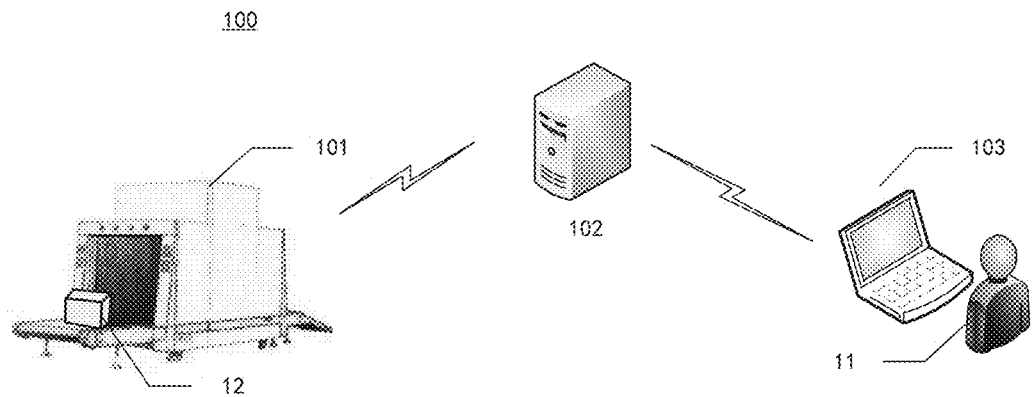
FIG. 1 schematically shows an application scenario of a method and a system of verifying an authenticity of declaration information, a device, a medium and a program product according to the embodiments of the present disclosure.

FIG. 1 schematically shows an application scenario 100 of a method and a system of verifying an authenticity of declaration information, a device, a medium and a program product according to the embodiments of the present disclosure. It should be noted that FIG. 1 is only an example of a system architecture to which embodiments of the present disclosure may be applied to assist those skilled in the art in understanding the technical content of the present disclosure, and does not mean that embodiments of the present disclosure may not be applied to other devices, systems, environments or scenarios.

As shown in FIG. 1, the application scenario 100 according to the embodiment may include an X-ray detection device 101, a server 102, and a terminal device 103. The X-ray detection device 101 and the terminal device 103 are respectively communicated with the server 102.

When a container 12 loaded with an article passes through the X-ray detection device 101, the container 12 may be scanned by the X-ray detection device 101 to obtain the machine-detected radiation image.

The X-ray detection device 101 may upload the scanned machine-detected radiation image to the server 102. Meanwhile, the server 102 may obtain the declaration information (for example, one or more declaration forms) corresponding to the article loaded in the container 12 by searching from a database, searching in a cloud, or uploading by staff 11 through the terminal device 103. According to embodiments of the present disclosure, the server 102 may perform the method of verifying an authenticity of declaration information according to embodiments of the present disclosure, combines the machine-detected radiation image and the declaration information, and use the cross-modal fusion device based on the attention mechanism to analyze whether the article in the container 12 is consistent with the declaration information, and whether there is a suspicion of false declaration. The server 102 may then send an analysis result to the terminal device 103 for display to the staff 11. Then, according to the analysis result, if the declaration information of the article in the container 12 is suspected, the staff 11 may open the container 12 for inspection; if there is no suspicion about the declaration information of the article in the container 12, then a spot check or clearance of the container 12 may be selected. In this way, the comprehensiveness and the accuracy of the examination may be improved to a certain extent while a manpower input of an inspection process may be saved.

In practical application, due to a possible phenomenon of order or container consolidation, the articles in the container 12 may correspond to one declaration form or a plurality of declaration forms, that is, the articles in the container 12 may be formed by assembling the articles in the plurality of declaration forms together. In another case, x containers may be loaded with declaration articles of y declaration forms, where x and y are integers, and x y. In this case, the articles in x containers may be continuously scanned to obtain a machine-detected radiation image, which is processed corresponding to the declaration information in y declaration forms. Alternatively, in this case, machine-detected radiation images obtained by scanning the articles in each of the x containers may be processed corresponding to the declaration information in the y declaration forms.

It should be noted that the method of verifying an authenticity of declaration information provided by embodiments of the present disclosure may generally be performed by the server 102. Accordingly, a system of verifying an authenticity of declaration information, a device, a medium and a program product provided by embodiments of the present disclosure may generally be provided in the server 102. The method of verifying an authenticity of declaration information provided by embodiments of the present disclosure may also be performed by a server or server cluster different from the server 102 and capable of communicating with the X-ray detection device 101, the terminal device 103, and/or the server 102. Accordingly, the system of verifying an authenticity of declaration information, the device, the medium and the program product provided by embodiments of the present disclosure may also be provided in a server or server cluster different from the server 102 and capable of communicating with the X-ray detection device 101, the terminal device 103 and/or the server 102.

It should be understood that the number and types of devices in FIG. 1 are only schematic. Depending on implementation needs, there may be any number and types of devices.

Figure 2:
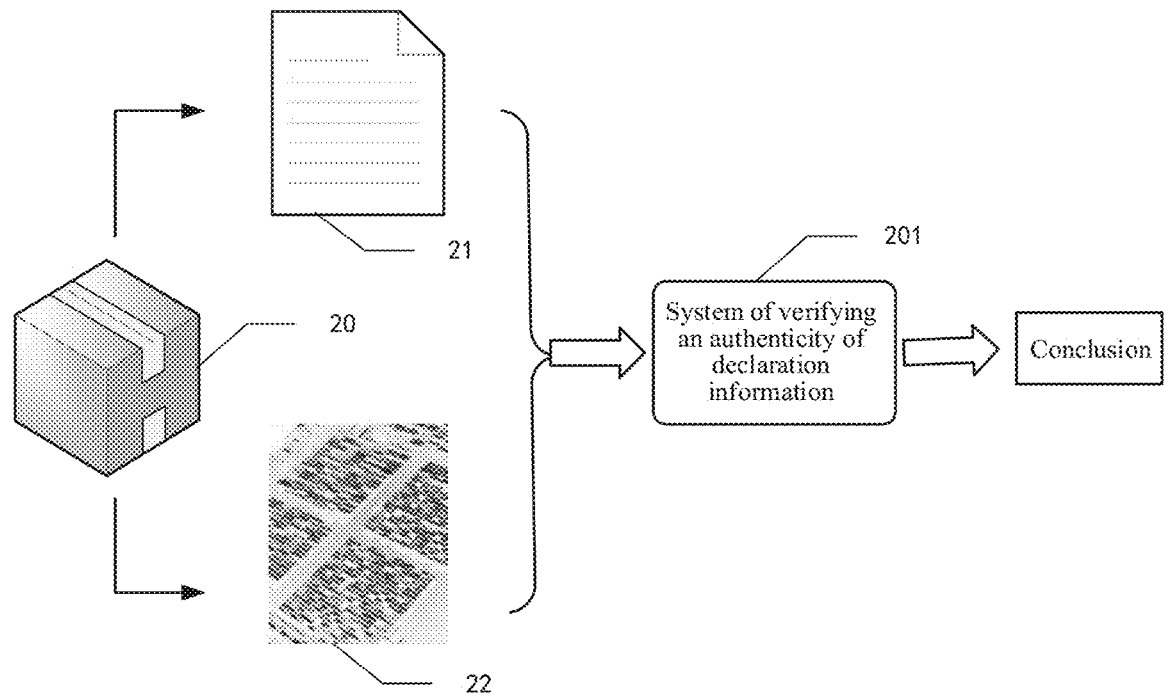
FIG. 2 schematically shows a conceptual diagram of a method of verifying an authenticity of declaration information according to the embodiments of the present disclosure.

FIG. 2 schematically shows a conceptual diagram of a method of verifying an authenticity of declaration information according to the embodiments of the present disclosure.

As shown in FIG. 2, according to embodiments of the present disclosure, in order to effectively verify whether the article loaded in the container 20 is consistent with the category of the article declared in the declaration information 21, the descriptive information such as a name, a specification model of the declared article may be obtained from the declaration information 21, and combining with the machine-inspected radiation image 22 obtained by scanning the container 20, a system 201 of verifying an authenticity of declaration information according to embodiments of the present disclosure may be used, through natural language processing technology, deep learning and other methods, to realize the intelligent inspection of the articles in container 20 to determine whether there is any false declaration.

According to some embodiments of the present disclosure, the machine-detected radiation image may be divided into different image blocks based on the article, and the system 201 uses visual coding technology such as image identification to obtain an image feature. Meanwhile, a text feature extracted from the declaration information is used as an external introduction feature of an attention mechanism, a cross-modal classifier is used to fuse the image feature with the text, a classification result of each image block is obtained through multi category constraint, and the result is compared with the declaration category filled in the declaration information to obtain a final inspection result.

The system 201 of verifying an authenticity of declaration information may be implemented, for example, as one or any combination of a system 1000, a system 1200, or an electronic device 1500, a computer storage medium, or a program product described below to realize the method of verifying an authenticity of declaration information according to embodiments of the present disclosure.

Figure 3:
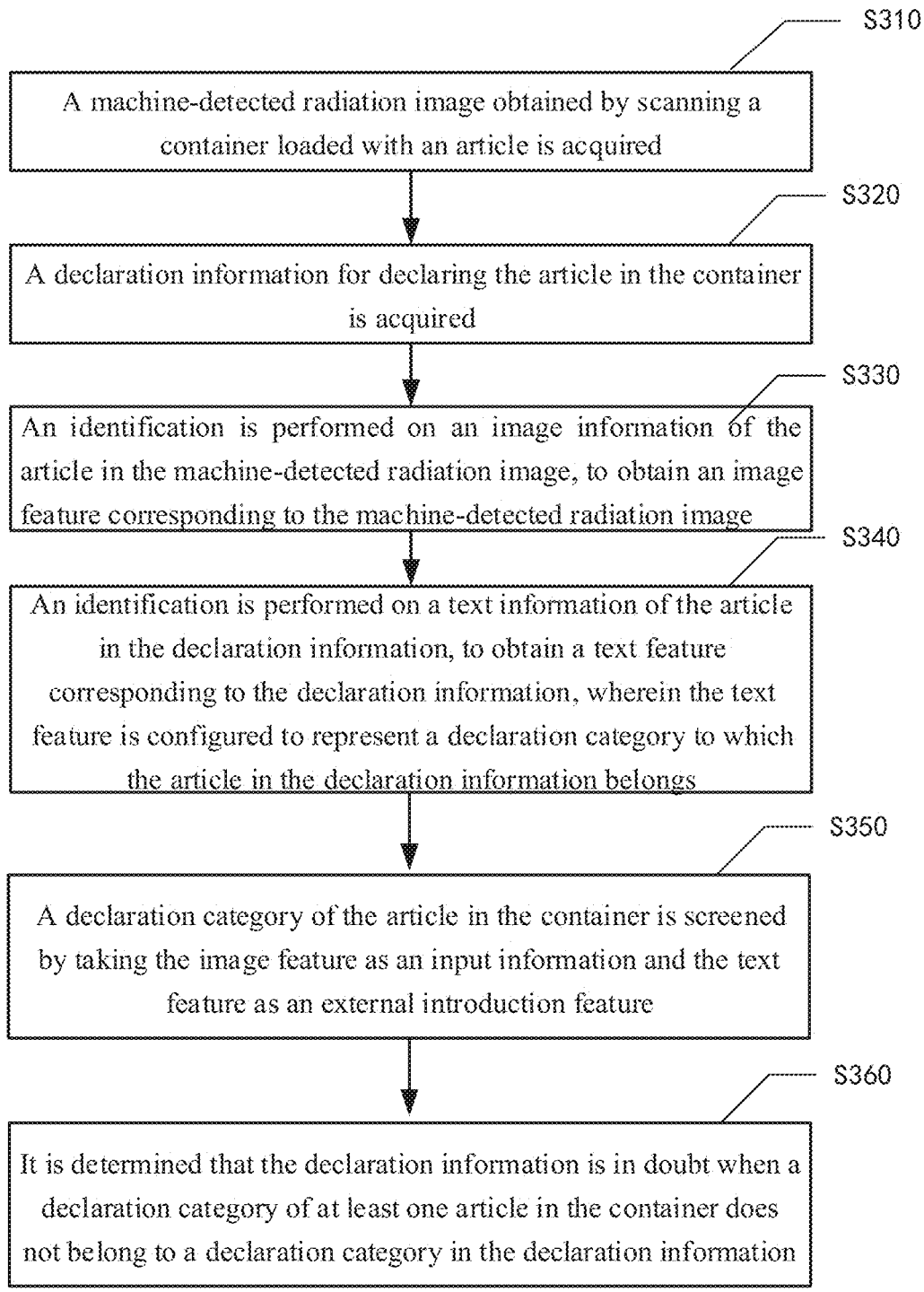
FIG. 3 schematically shows a flowchart of a method of verifying an authenticity of declaration information according to the embodiments of the present disclosure.

FIG. 3 schematically shows a flowchart of a method of verifying an authenticity of declaration information according to the embodiments of the present disclosure.

As shown in FIG. 3, the method of verifying an authenticity of declaration information according to the embodiment may include operation S310 to operation S360.

First, in operation S310, a machine-detected radiation image obtained by scanning a container loaded with an article is acquired.

And in operation S320, a declaration information for declaring the article in the container is acquired.

Next, in operation S330, an identification is performed on an image information of the article in the machine-detected radiation image, to obtain an image feature corresponding to the machine-detected radiation image.

And in operation S340, an identification is performed on a text information of the article in the declaration information, to obtain a text feature corresponding to the declaration information, wherein the text feature is used for representing a declaration category to which the article in the declaration information belongs. For example, according to the descriptive information (for example, name information, specification model, etc.) of the declared article in the declaration information, a tax number category or commodity category to which the declared article belongs may be classified.

Then, in operation S350, a declaration category of the article in the container is screened by taking the image feature as an input information and the text feature as an external introduction feature.

In an embodiment, a cross-modal decoder is used to screen the declaration category of the article in the container by taking the image feature as an input information of the cross-modal decoder and the text feature as an external introduction feature of an attention mechanism of the cross-modal decoder.

The cross-modal decoder may adopt, for example, a transformer decoder, the text feature may be introduced into a mutual attention module of the transformer decoder as an external introduction feature, and the image feature may be used as an input of the transformer decoder to screen the declaration category to which each article in the image feature belongs. Through an interaction between the text feature and the image feature, a cross-modal information fusion may be completed.

Then, in operation S360, it is determined that the declaration information is in doubt when a declaration category of at least one article in the container does not belong to a declaration category in the declaration information. The declaration category in the declaration information here may be the declaration category filled in by the user when filling in the declaration form. The declaration category and text feature filled in by the user when filling in the declaration form may be mapped to a same or different declaration category. After all, there may be fraud when the user fills in the declaration form. Therefore, embodiments of the present disclosure map a real declaration category of the article through the text feature, and verify the declaration information filled in by the user through a fusion output of the text feature and the image feature.

The image feature may include N1 first image feature vectors corresponding to image information of N1 articles in the machine-detected radiation image, respectively, wherein N1 is an integer greater than or equal to 1. For example, when extracting the image feature, the machine-detected radiation image is divided into different image blocks according to the contour boundary of the articles in the machine-detected radiation image, and then the first image feature vector may be identified for each image block.

The text feature may include N2 text feature vectors corresponding to N2 articles in the declaration information, respectively, wherein N2 is an integer greater than or equal to 1. In the embodiments of the present disclosure, an identification is performed on the declaration category to which the article belongs according to the article description information in the declaration information, so that when there are N2 articles declared, N2 text feature vectors will be obtained.

According to embodiments of the present disclosure, when N1 first image feature vectors are respectively input into or combined into a sequence and input into the cross-modal decoder, and N2 second feature vectors are combined into a sequence and input into the mutual attention module of the cross-modal decoder, a cross-modal information fusion may be achieved through an interactive operation between the features. After each first feature vector interacts with N2 second feature vectors, a corresponding result may be obtained, which is a probability output of each category corresponding to the article in the container. That is, each article will obtain a probability value of its predicted category. A topN (e.g., N=1 or 2) method may be used to take the top N categories as the candidate categories of the article. When the candidate categories are not included in the declaration category filled in the declaration information, it is considered that the risk is high and the declaration information is suspected. Otherwise, the declaration information may be considered as unsuspected.

Therefore, in the embodiments of the present disclosure, the declared articles are comprehensively analyzed by combining the declaration information and the machine-detected radiation image, thereby improving information use efficiency and inspection accuracy.

Figure 4:
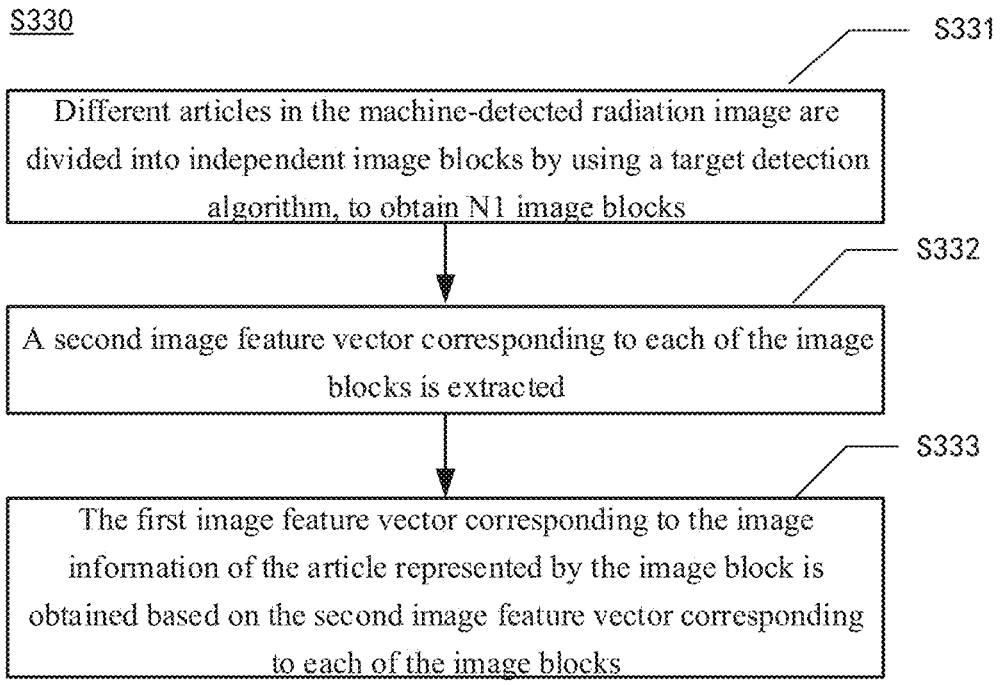
FIG. 4 schematically shows a flowchart of extracting an image feature in a method of verifying an authenticity of declaration information according to the embodiments of the present disclosure.

FIG. 4 schematically shows a flowchart of operation S330 of extracting an image feature in a method of verifying an authenticity of declaration information according to an embodiment of the present disclosure As shown in FIG. 4, according to the embodiment, operation S330 may include operation S331 to operation S333.

In operation S331, different articles in the machine-detected radiation image are divided into independent image blocks by using a target detection algorithm to obtain N1 image blocks.

In operation S332, a second image feature vector corresponding to each of the image blocks is extracted. For example, an image feature extraction module may be used to extract the second image feature vector corresponding to the image block. In an embodiment, the image feature extraction module may be a convolutional neural network.

According to an embodiment of the present disclosure, the image feature extraction module may specifically be a network structure taking resnet as a basic network and adding SE-block after a resnet pooling layer. For example, resnet may be used as a basic network, and SE-block (Squeeze-Extract Block), a full connection layer fc1 and a full connection layer fc2 may be added after an original resnet pooling layer. In an embodiment, an output result of the full connection layer fc1 may be used as a second image feature vector to obtain a set of second image feature vectors.

The image feature extraction module may be trained by using image blocks in a historically declared machine-detected radiation image. For example, image blocks of a same article under different forms are acquired, and the image feature extraction module learns and identifies possible forms of the same article in the machine-detected radiation image through a pre-labeling.

In operation S333, the first image feature vector corresponding to the image information of the article represented by the image block is obtained based on the second image feature vector corresponding to each image block.

In an embodiment, the second image feature vector may be directly used as the first feature vector.

In other embodiments, the second image feature vector may also be further processed to obtain the first image feature vector. For example, the second feature vector may be processed based on the position information of each image block in the machine-detected radiation image, to obtain a feature that may reflect a spatial position relationship of the image block in the machine-detected radiation image as the first feature vector. In this way, when category identification is performed in S350, the category identification may be more comprehensive, and to some extent, may also avoid missing or repeated identification of the article in the container, so as to improve the identification efficiency.

Figure 5:
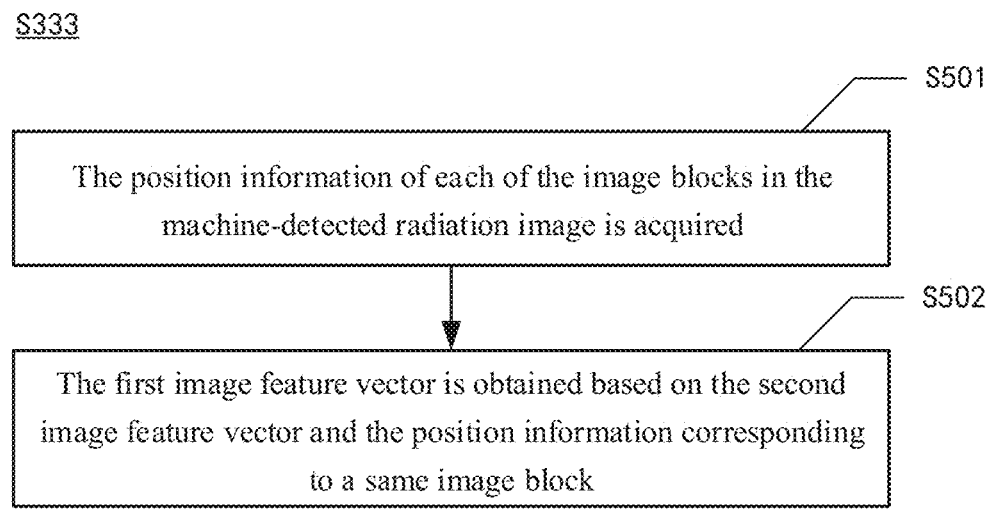
FIG. 5 schematically shows a flowchart of obtaining an image feature by combining a position information in a method of verifying an authenticity of declaration information according to the embodiments of the present disclosure.

FIG. 5 schematically shows a flowchart of S333 of obtaining an image feature by combining a position information in a method of verifying an authenticity of declaration information according to an embodiment of the present disclosure.

As shown in FIG. 5, according to embodiments of the present disclosure, operation S333 may include operation S501 and operation S502. In this embodiment, the second feature vector may be processed according to the position information of each image block to obtain the first feature vector.

Specifically, in operation S501, the position information of each image block in the machine-detected radiation image is acquired. The position information may be, for example, coordinates of a positioning point in an outer contour of each image block. For example, when the image block is a regular geometry (in general, articles in customs declaration and other services are packaged in a packaging box), a location information may be coordinates of a vertex or intersection of the geometry.

Then, in operation S502, the first image feature vector is obtained based on the second image feature vector and the position information corresponding to a same image block.

In an embodiment, firstly, the second image feature vector may be processed using the position information of the image block, for example, the position information of the image block may be processed into a vector, and then connected with the second image feature vector corresponding to the image block; alternatively, for example, mapping conversion processing such as encoding may be performed on the second feature vector using the position information of the image block. Then the second image feature vector processed by the position information may be input to the encoder, and an output of the encoder may be obtained, so that the output of the encoder may be used as the first image feature vector corresponding to the image block.

According to embodiments of the present disclosure, when the output of the encoder is used as the first image feature vector corresponding to the image block, the encoder and the cross-modal decoder used in operation S350 may be jointly trained.

During the joint training, the encoder and the cross-modal decoder form an upstream downstream relationship. The vector obtained by processing the second feature vector by using the position information of image blocks of various articles declared in history may be used as the input of the encoder. The output of the encoder may be used as the input of the cross-modal decoder, and the text feature corresponding to historical declaration information may be used as the input of the mutual attention module of the cross-modal decoder. The declaration category of the image block output by the cross-modal decoder may be acquired, and then the encoder and the cross-modal fusion decoder may be repeatedly trained based on an error between the declaration category of the image block output by the cross-modal decoder and the declaration category marked on the image block.

According to embodiments of the present disclosure, the encoder may adopt a transformer encoder model. Accordingly, the cross-modal decoder may adopt a transformer decoder model.

Figure 6:
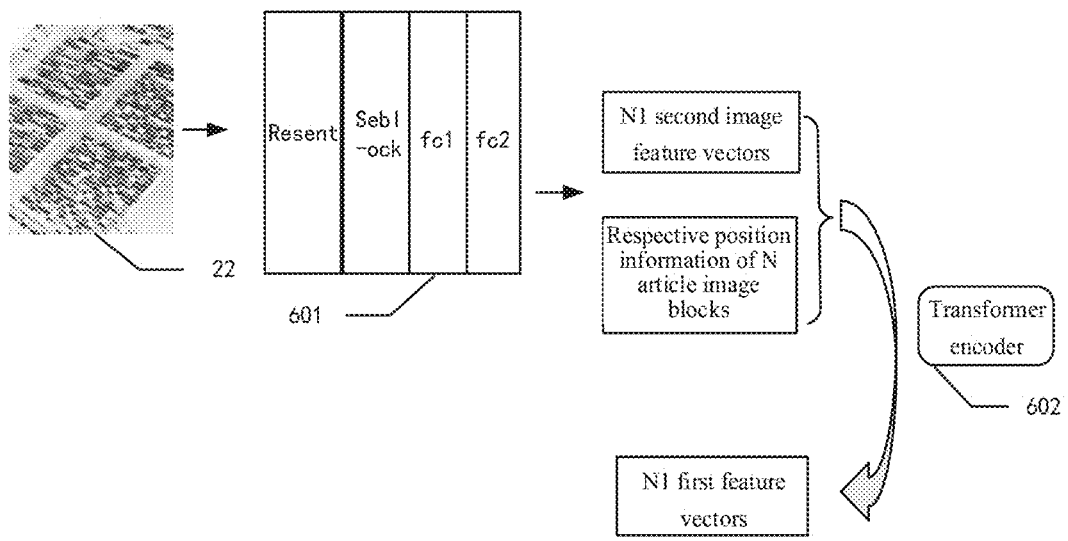
FIG. 6 schematically shows a flow diagram of extracting an image feature in a method of verifying an authenticity of declaration information according to the embodiments of the present disclosure.

FIG. 6 schematically shows a flow diagram of extracting an image feature in a method of verifying an authenticity of declaration information according to the embodiments of the present disclosure.

As shown in FIG. 2 and FIG. 6, an object detection method may be used to divide the articles into independent image blocks according to their performance in the machine-detected radiation image 22, and extract corresponding position coordinates.

Then the image feature extraction module 601 is used to extract the features of different image blocks. In FIG. 6, the image feature extraction module 601 may use resnet (Deep Residual Network, which is a classic convolutional neural network) as a basic network, and add SE-block (Squeeze-Extract Block) neural network structure unit, a full connection layer fc1-relu (relu is a linear rectification unit) and a full connection layer fc2 after the original resnet pooling layer. The number of SE-block channels may be set as the number of categories, and in this way, a channel attention mechanism may be introduced, and an output result of full connection layer fc1 may be used as the second image feature vector of each image block, thereby obtaining a set of second image feature vectors. Assume that the size of the set of second image feature vectors is N1*dim, where N1 represents the number of image blocks, and dim represents a feature dimension of each second image feature vector.

Next, N1 second image feature vectors (that is, N1*dim) and the position information corresponding to each image block may be substituted into the transformer encoder 601 to obtain N1 first image feature vectors, and then the results may be used as the input of the cross-modal decoder (for example, the transformer decoder) in operation S350.

Figure 7:
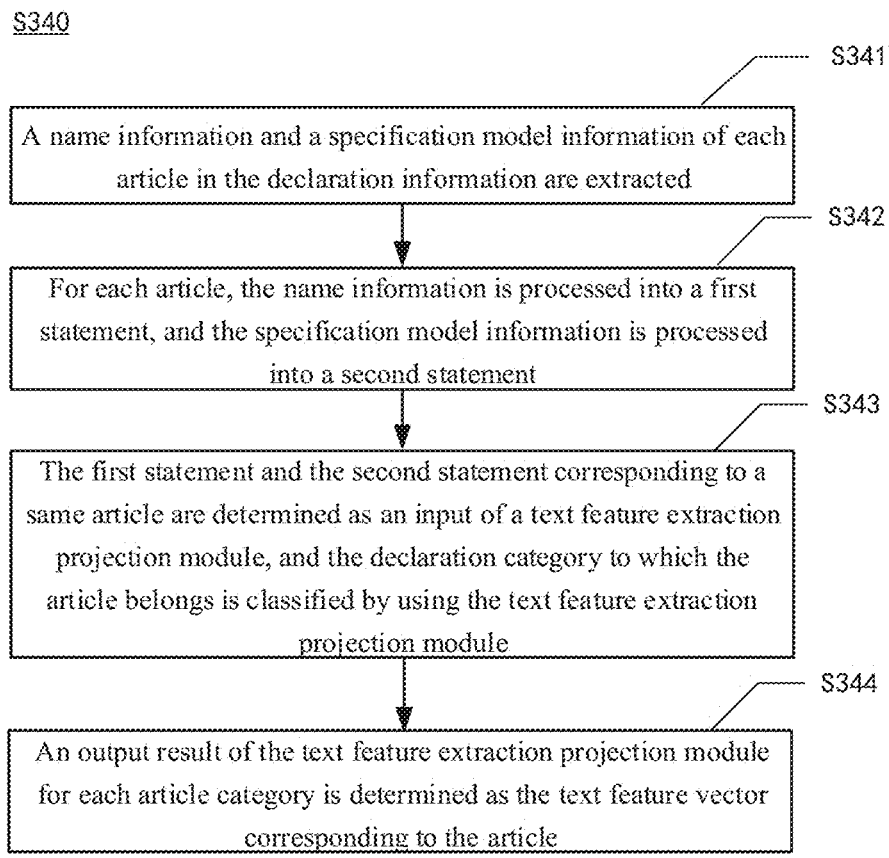
FIG. 7 schematically shows a flowchart of extracting a text feature in a method of verifying an authenticity of declaration information according to the embodiments of the present disclosure.

FIG. 7 schematically shows a flowchart of operating S340 of extracting a text feature in a method of verifying an authenticity of declaration information according to the embodiments of the present disclosure.

As shown in FIG. 7, according to embodiments of the present disclosure, operation S340 may include operation S341 to operation S344.

In operation S341, a name information and a specification model information of each article in the declaration information are extracted.

In operation S342, for each article, the name information is processed into a first statement, and the specification model information is processed into a second statement.

In operation S343, the first statement and the second statement corresponding to a same article are determined as an input of a text feature extraction projection module, and the declaration category to which the article belongs is classified by using the text feature extraction projection module.

In operation S344, an output result of the text feature extraction projection module for each article category is determined as the text feature vector corresponding to the article, wherein N2 text feature vectors are correspondingly obtained for N2 articles.

In an embodiment of the present disclosure, the text feature extraction projection module may adopt a BERT model. During a training, the BERT model may be trained by collecting historical declaration information. The name information of each article in the historical declaration information is processed into the first statement, and the specification model information is processed in the second statement. A statement sequence is formed and input into the BERT model, and the category of each article is output. Then, based on an error between the category corresponding to the text feature vector output by the BERT model and the declaration category to which each article actually belongs, the BERT model (i.e., Bidirectional Encoder Representations from Transformers model) is repeatedly trained.

Figure 8:
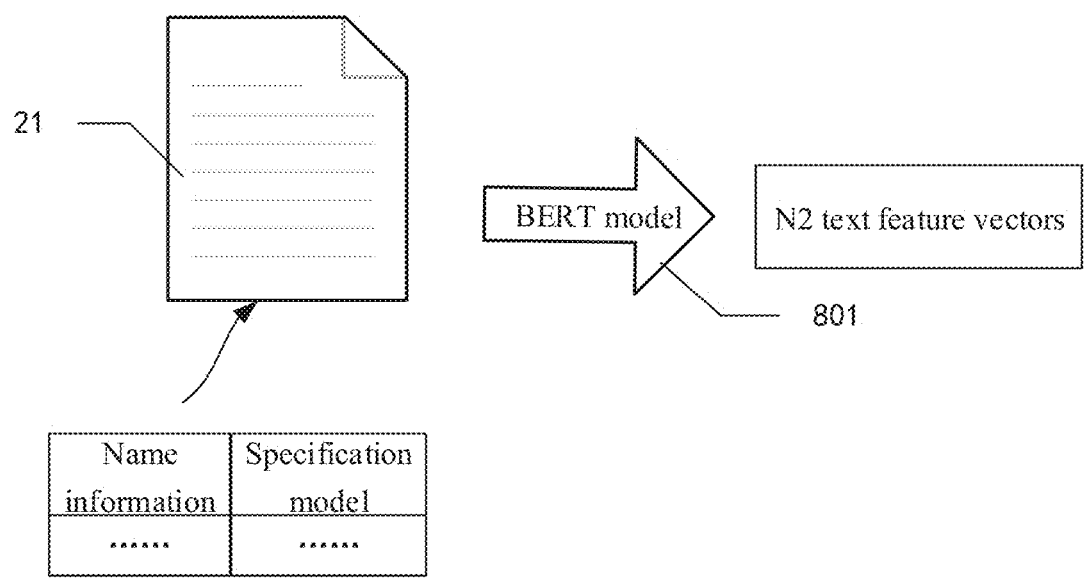
FIG. 8 schematically shows a flow diagram of extracting a text feature in a method of verifying an authenticity of declaration information according to the embodiments of the present disclosure.

FIG. 8 schematically shows a flow diagram of extracting a text feature in a method of verifying an authenticity of declaration information according to the embodiments of the present disclosure.

Referring to FIG. 2 and FIG. 8, in this embodiment, the BERT model is used to extract a text feature in the declaration information 21.

If there is only one article in the declaration information 21, the name information and specification model of the article are directly extracted from the declaration information 21. After a preprocessing, a BERT model 801 is used to extract a category output as the text feature of the article, that is, the text feature vector, with a dimension of 1*dim.

If the declaration information 21 includes a plurality of articles, and N2 articles is assumed, N2 represents the number of article names, and dim represents the feature dimension. For the plurality of articles, it is necessary to align the name information and the specification model of the same article one by one, and then repeat the above-mentioned step to obtain N2 dim-dimensional text feature vectors, forming a N2*dim text feature vector sequence.

In this way, a natural language processing method is used to obtain text features that may represent the name information and specification model of the article. The text features are introduced into the mutual attention module of the cross-modal decoder as external introduction features.

Figure 9:
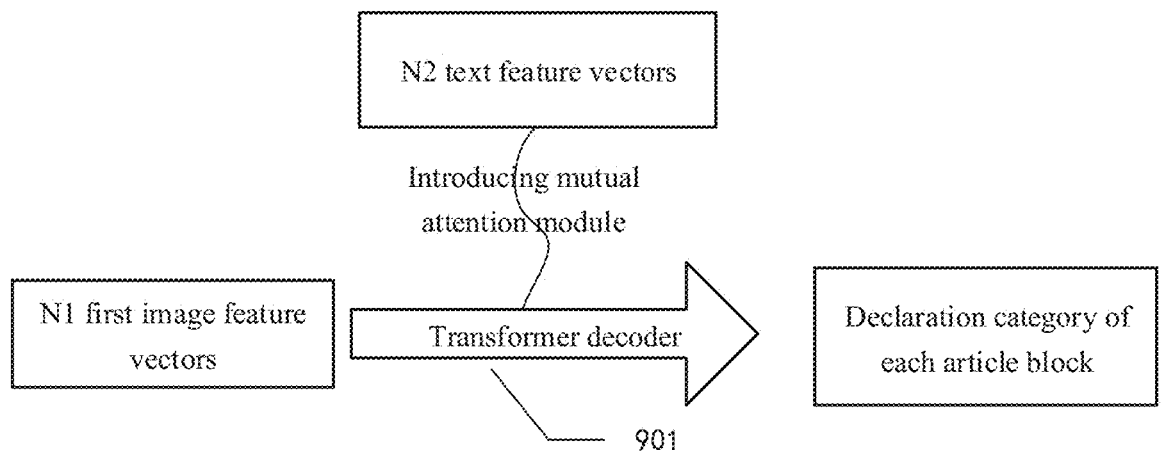
FIG. 9 schematically shows a flow diagram of screening a declaration category of an article in the container in a method of verifying an authenticity of declaration information according to the embodiments of the present disclosure.

FIG. 9 schematically shows a flow diagram of operation 350 of screening a declaration category of an article in the container in a method of verifying an authenticity of declaration information according to an embodiment of the present disclosure.

As shown in FIG. 9, in operation S350, a cross-modal decoder 901 may be used to screen a declaration category of an article in the container. The cross-modal decoder may adopt transformer decoder 901. N1 first image feature vectors may be used as an input of the transformer decoder 901, N2 text feature vectors may be used as an input of a mutual attention module of the transformer decoder 901, and an output value of the transformer decoder 901 may be taken as a final comparison result. That is, each article block will obtain a probability value of its predicted declaration category, and the topN method may be used to take the top N categories as the candidate categories of the image block. When the candidate categories do not belong to the declaration category, it is considered that the risk is high, otherwise, it may be considered as unsuspected.

In order to facilitate a calculation, the dimensions dim of the vectors in the image feature and the text feature may be set equal.

In a case where there are a plurality of types of articles under a same declaration category, it is difficult to accurately determine the articles using the image information alone. In the cross-modal decoder of embodiments of the present disclosure, through an interaction between the machine-detected radiation image and the declaration information, the text features that may represent the name information and the specification model of the article are obtained by using the natural language processing method, which may make up for a deficiency of the image information from the article text description information, and improve the identification accuracy.

When a cross-modal fusion is performed by using the transformer decoder 901, N2 text feature vectors are used as the external features of the mutual attention module of the transformer decoder 901, and need to be input as a whole. N1 first image feature vectors are the identification objects of the transformer decoder 901, and may be input separately or combined into a sequence for input, which may be set according to the actual situation.

According to embodiments of the present disclosure, in order to deal with a problem of accurate customs declaration and inspection when one declaration category corresponds to a variety of articles, an original whole machine-detected radiation image is divided into different image blocks by using the target detection method, and independent article features are obtained by extracting the features of the image blocks, which may improve the identification accuracy.

In order to effectively extract article features, embodiments of the present disclosure may set the number of SE-block channels as the number of categories in the image feature extraction module to introduce channel attention mechanism, so as to improve an accuracy of image feature extraction.

In order to reflect a spatial position relationship of the article block, embodiments of the present disclosure may send the position information and feature information of the image block into the transformer encoder together to obtain a feature with the spatial position relationship (i.e., the first feature vector).

In embodiments of the present disclosure, in a process of model training, a mode of combining three training tasks is adopted, that is, an image training is used to train the image feature extraction module (for example, the module 601), a text training is used to train the text feature extraction projection module (for example, the BERT model 801), and an image-text training is used to jointly train the encoder and the cross-modal decoder (for example, the transformer encoder 602 and the transformer encoder 901), which makes different tasks complement each other.

Figure 10:
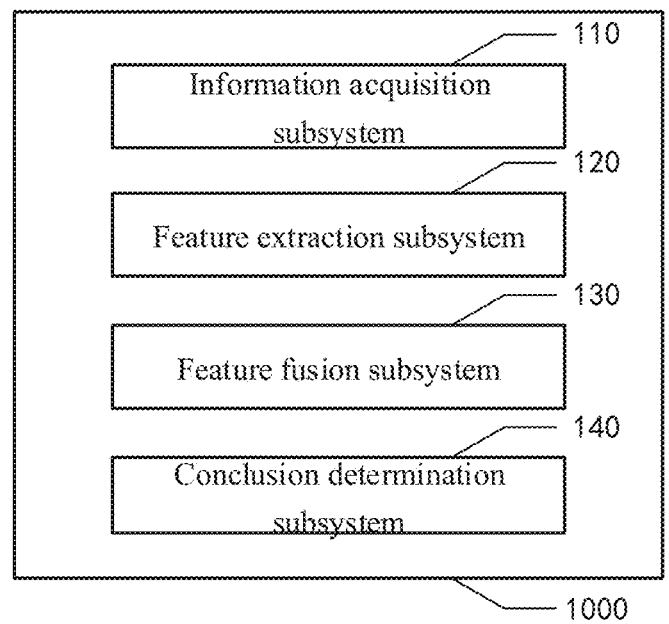
FIG. 10 schematically shows a block diagram of a system of verifying an authenticity of declaration information according to the embodiments of the present disclosure.

FIG. 10 schematically shows a block diagram of a system 1000 of verifying an authenticity of declaration information according to the embodiments of the present disclosure.

As shown in FIG. 10, the system 1000 of verifying an authenticity of declaration information according to an embodiment of the present disclosure may include an information acquisition subsystem 110, a feature extraction subsystem 120, a feature fusion subsystem 130, and a conclusion determination subsystem 140. The system 1000 may be used to implement the methods described with reference to FIG. 3 to FIG. 9.

Specifically, the information acquisition subsystem 110 may be used to acquire a machine-detected radiation image obtained by scanning a container loaded with an article, and acquire a declaration information for declaring the article in the container. In an embodiment, the information acquisition subsystem 110 may be used to perform operation S310 and operation S320.

The feature extraction subsystem 120 may be used to perform an identification on an image information of the article in the machine-detected radiation image to obtain an image feature corresponding to the machine-detected radiation image, and perform an identification on a text information of the article in the declaration information to obtain a text feature corresponding to the declaration information, wherein, the text feature is used for representing a declaration category to which the article in the declaration information belongs. In an embodiment, the feature extraction subsystem 120 may be used to perform operation S330 and operation S340.

The feature fusion subsystem 130 may be used to screen a declaration category of the article in the container by taking the image feature as an input information and the text feature as an external introduction feature. For example, the image feature is used as the input information of the cross-modal decoder, and text feature is used as the external introduction feature of the attention mechanism of the cross-modal decoder. The cross-modal decoder is used to screen the declaration category of the article in the container. In an embodiment, the feature fusion subsystem 130 may be used to perform operation S350.

The conclusion determination subsystem 140 may be used to determine that the declaration information is in doubt when a declaration category of at least one article in the container does not belong to a declaration category in the declaration information. In an embodiment, the conclusion determination subsystem 140 may be used to perform operation S360.

Figure 11:
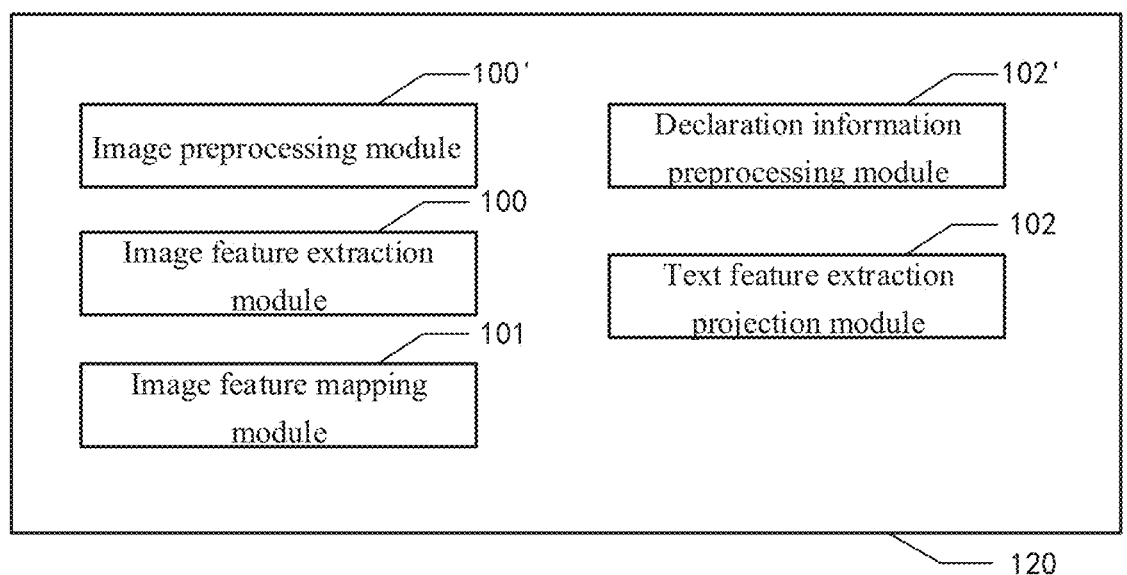
FIG. 11 schematically shows a block diagram of a feature extraction submodule in a system of verifying an authenticity of declaration information according to the embodiments of the present disclosure.

FIG. 11 schematically shows a block diagram of a feature extraction subsystem 120 in a system of verifying an authenticity of declaration information according to an embodiment of the present disclosure.

As shown in FIG. 11, according to some embodiments of the present disclosure, the feature extraction subsystem 120 may include an image preprocessing module 100', an image feature extraction module 100, and an image feature mapping module 101. The image feature includes N1 first image feature vectors corresponding to image information of N1 articles in the machine-detected radiation image, respectively, wherein N1 is an integer greater than or equal to 1.

The image preprocessing module 100' may be used to divide different articles in the machine-detected radiation image into independent image blocks by using a target detection algorithm to obtain N1 image blocks. In an embodiment, the image preprocessing module 100' may perform operation S331.

The image feature extraction module 100 may be used to extract the second image feature vector corresponding to each image block. In an embodiment, the image feature extraction module 100 may perform operation S332.

The image feature mapping module 101 may be used to obtain the first image feature vector corresponding to the image information of the article represented by the image block based on the second image feature vector corresponding to each image block. In an embodiment, the image feature extraction module 101 may perform operation S333.

Continuing to refer to FIG. 11, according to other embodiments of the present disclosure, the feature extraction subsystem 120 may also include a declaration information preprocessing module 102' and a text feature extraction projection module 102. The text feature may include text feature vectors corresponding to N2 articles in the declaration information, respectively, wherein N2 is an integer greater than or equal to 1.

The declaration information preprocessing module 102' is used to extract the name information and the specification model information of each article in the declaration information, and process the name information into a first statement and the specification model information into a second statement for each article. In an embodiment, the declaration information preprocessing module 102' may perform operation S341 and operation S342.

The text feature extraction projection module 102 is used to determine the first statement and the second statement corresponding to a same article as an input, and classify the declaration category to which the article belongs, and an output result of the text feature extraction projection module for each article category is used as the text feature vector corresponding to the article, where N2 text feature vectors are correspondingly obtained for N2 articles. In some embodiments, the text feature extraction projection module 102 may perform operation S343 and operation S344.

Figure 12:
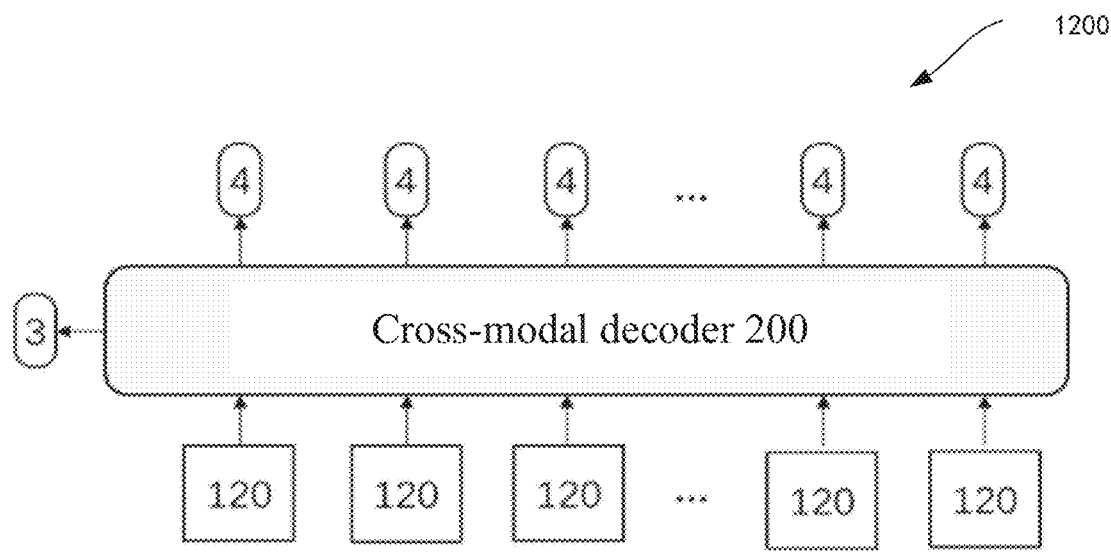
FIG. 12 schematically shows an overall structure diagram of a system of verifying an authenticity of declaration information according to another embodiment of the present disclosure.

FIG. 12 schematically shows an overall structure diagram of a system of verifying an authenticity of declaration information according to another embodiment of the present disclosure.

As shown in FIG. 12, the system 1200 of verifying an authenticity of declaration information according to the embodiment may include a feature extraction subsystem 120 and a cross-modal decoder 200. The system 1200 will output an overall conclusion 3 and a block conclusion 4. The feature extraction subsystem 120 may refer to FIG. 13, and the cross-modal decoder 200 may refer to FIG. 14.

Figure 13:
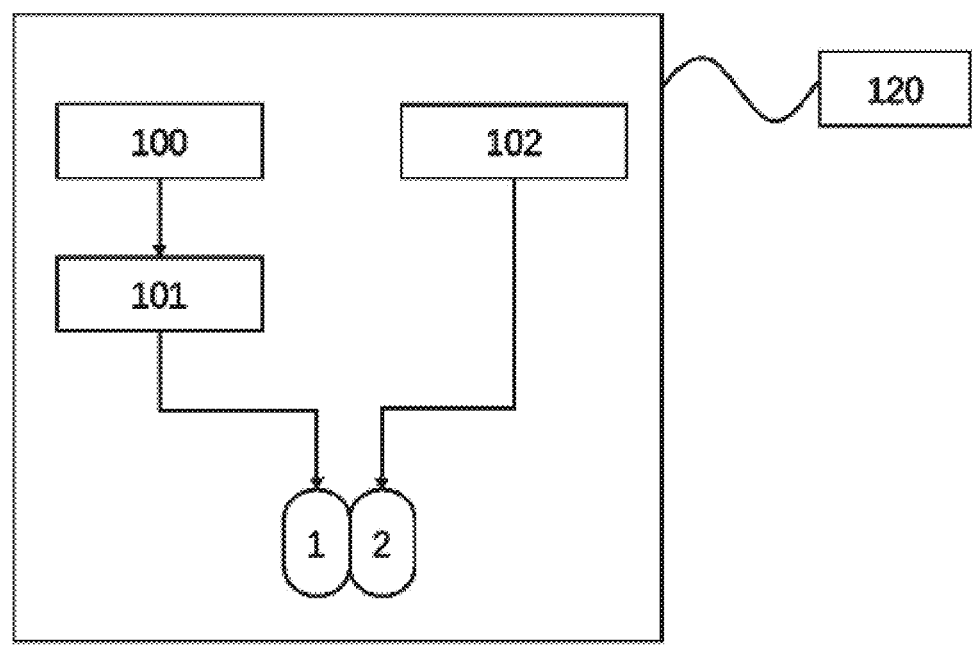
FIG. 13 schematically shows a structure diagram of a feature extraction subsystem in a system of verifying an authenticity of declaration information according to an embodiment of the present disclosure.

FIG. 13 schematically shows a structure diagram of the feature extraction subsystem 120 in the system 1200 of verifying an authenticity of declaration information according to an embodiment of the present disclosure.

As shown in FIG. 13, the feature extraction subsystem 120 according to the embodiment may include two branches: image feature extraction and declaration information extraction.

The image feature extraction branch includes an image feature extraction module 100 and an image feature mapping module 101, and outputs image feature 1.

The declaration information extraction branch includes a text feature extraction projection module 102, and outputs text feature 2.

Figure 14:
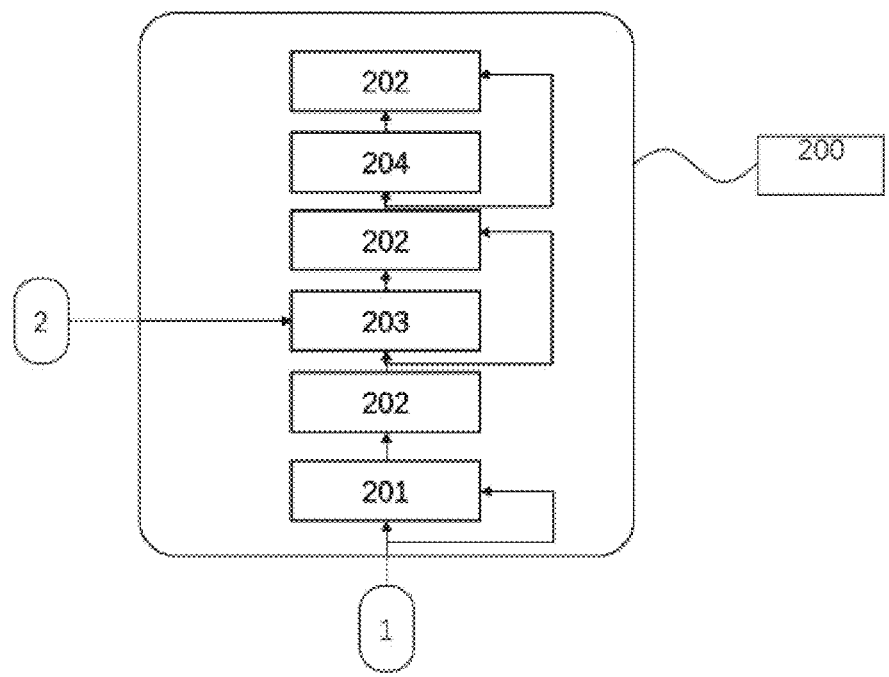
FIG. 14 schematically shows a structural diagram of a cross-modal decoder in a system of verifying an authenticity of declaration information according to an embodiment of the present disclosure.

FIG. 14 schematically shows a structural diagram of the cross-modal decoder 200 in the system 1200 of verifying an authenticity of declaration information according to an embodiment of the present disclosure.

As shown in FIG. 14, the cross-modal decoder 200 is composed of a multi-head self-attention module 201, a feature addition and normalization module 202, a multi-head mutual attention module 203, and a feedforward network 204. The input is the image feature 1 and the text feature 2 extracted by 120. The image feature 1 is used as the primary input information of the multi-head self-attention module 201, and the text feature 2 is introduced into the multi-head mutual attention module 203 as enhanced information.

Referring to FIG. 12 to FIG. 14, according to embodiments of the present disclosure, when the system 1200 is working, for the machine-detected radiation image, the target detection method is used to obtain the coordinate positions of different articles (differentiating article blocks in the image by a boundary and texture of the image) in the image, and the image blocks are extracted according to the coordinate positions as the input of the image feature extraction module 100.

Before the image blocks enter the image feature extraction module 100, a data enhancement processing may be performed, including a series of operations such as rotation, resizing to a fixed size, mean value removal, and standardization.

When a fixed size image block is input into the image feature extraction module 100, cross entropy is used for constraint. In order to obtain better image features, a combination of resnet50+SE-block may be used to extract the features of the image block, and extract the penultimate layer of the network (i.e., the output result of the full connection layer fc1) as the features of the image block (i.e., the second image feature vector).

Then, the extracted features of the image block are substituted into the image feature mapping module 101. A structure of the image feature mapping module 101 adopts the transformer encoder structure, which may process the position coordinates corresponding to the image block into the vector, then connect the features of the image block with the position coordinates corresponding to the image block (connected in a direction of the feature dimension), input them into the transformer encoder, and obtain new image block features (i.e., the first image feature vector) with spatial position relationship.

For the declaration information of an article in a declaration form, the following pre-processing steps may be carried out first: independent numbers in the specification model are removed, some stop words and symbols are deleted, and/or English letters in a text are unified into lowercase.

Then, the processed name information of the article is determined as statement 1, and the specification model of the declared article is determined as statement 2, and the statement 1 and the statement 2 are input to the text feature extraction projection module 102 (for example, the BERT model) for text feature extraction. In a training process of the text feature extraction projection module 102, multivariate cross entropy may be used as a loss function to constrain the training process, and a pooled result of the last layer in the model may be used as the category output of the declared article. When a declaration form contains multiple kinds of articles under a commodity number, the name and specification model of the declared articles need to be mapped one by one and treated as multiple articles. A process of processing the declaration information of a single article is repeated, and the text features of the declaration information of each article are obtained through a feed-forward process of the BERT model and are connected.

Then, the image feature 1 and the text feature 2 output by the feature extraction subsystem 120 are substituted into the cross-modal decoder 200. The cross-modal decoder 200 may use the transformer decoder module to input the image feature 1 as the value of the cross-modal decoder 200, and introduce the text feature 2 into the mutual attention module 203, and complete a cross-modal information fusion through an interactive operation between features. After the image feature of each image block interacts with the text feature in the declaration information, a corresponding result will be obtained. The result is a probability output of multiple categories, and this value is used to determine whether the goods loaded in the container are consistent with the declaration category in the declaration information.

Any number of modules, sub-modules, units, sub-units, or at least part of the function of any number thereof according to embodiments of the present disclosure may be implemented in one module. Any one or more of the modules, sub-modules, units, and sub-units according to embodiments of the present disclosure may be divided into a plurality of modules for implementation. Any one or more of the modules, sub-modules, units, sub-units according to embodiments of the present disclosure may be implemented at least partially as a hardware circuit, such as a field programmable gate array (FPGA), a programmable logic array (PLA), a system on a chip, a system on a substrate, a system on a package, an application specific integrated circuit (ASIC), or may be implemented by any other reasonable means of hardware or firmware that integrates or packages a circuit, or may be implemented in any one of or a suitable combination of three implementation methods of software, hardware, and firmware. Alternatively, one or more of the modules, sub-modules, units, and sub-units according to embodiments of the present disclosure may be implemented at least partially as a computer program module, which when executed, may perform a corresponding function.

For example, any number of the information acquisition subsystem 110, the feature extraction subsystem 120, the feature fusion subsystem 130, the conclusion determination subsystem 140, the image preprocessing module 100', the image feature extraction module 100, the image feature mapping module 101, the declaration information preprocessing module 102', the text feature extraction projection module 102 or the cross-modal decoder 200 may be combined into one module to be implemented or any one of the modules may be divided into a plurality of modules. Alternatively, at least part of the function of one or more of these modules may be combined with at least part of the function of other modules and implemented in one module. According to embodiments of the present disclosure, at least one of the information acquisition subsystem 110, the feature extraction subsystem 120, the feature fusion subsystem 130, the conclusion determination subsystem 140, the image preprocessing module 100', the image feature extraction module 100, the image feature mapping module 101, the declaration information preprocessing module 102', the text feature extraction projection module 102 or the cross-modal decoder 200 may be implemented at least partially as a hardware circuit, such as a field programmable gate array (FPGA), a programmable logic array (PLA), a system on a chip, a system on a substrate, a system on a package, an application specific integrated circuit (ASIC), or may be implemented by any other reasonable means of hardware or firmware that integrates or packages a circuit, or may be implemented in any one of or a suitable combination of three implementation methods of software, hardware and firmware. Alternatively, at least one of the information acquisition subsystem 110, the feature extraction subsystem 120, the feature fusion subsystem 130, the conclusion determination subsystem 140, the image preprocessing module 100', the image feature extraction module 100, the image feature mapping module 101, the declaration information preprocessing module 102', the text feature extraction projection module 102 or the cross-modal decoder 200 may be implemented at least partially as a computer program module, which when executed, may perform a corresponding function.

Figure 15:
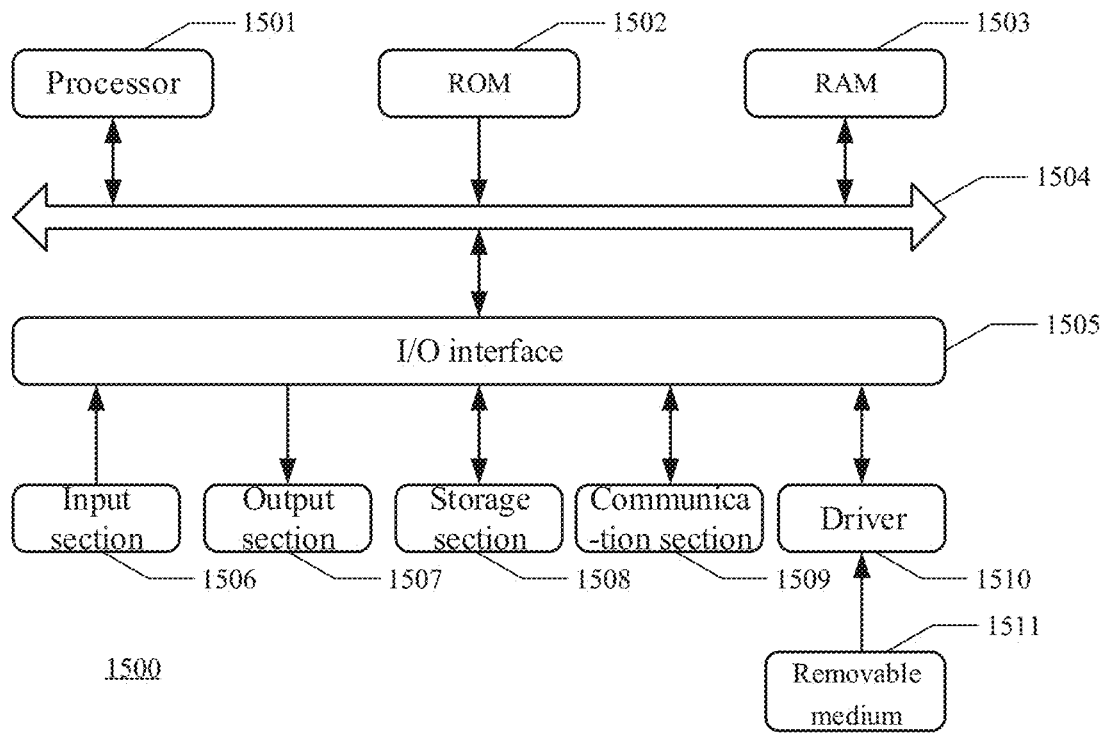
FIG. 15 schematically shows a block diagram of an electronic device adapted to implement a method of verifying an authenticity of declaration information according to the embodiments of the present disclosure.

FIG. 15 schematically shows a block diagram of an electronic device adapted to implement a method of verifying an authenticity of declaration information according to an embodiment of the present disclosure. The electronic device 1500 shown in FIG. 15 is only an example, and should not impose any limitation on the function and scope of use of embodiments of the present disclosure.

As shown in FIG. 15, the electronic device 1500 according to embodiments of the present disclosure includes a processor 1501 that may perform various appropriate actions and processes according to programs stored in a read-only memory (ROM) 1502 or programs loaded from a storage portion 1508 into a random access memory (RAM) 1503. The processor 1501 may include, for example, a general-purpose microprocessor (e.g., a CPU), an instruction set processor and/or a related chipset and/or a special-purpose microprocessor (e.g., an application-specific integrated circuit (ASIC)), etc. The processor 1501 may also include an on-board memory for caching purposes. The processor 1501 may include a single processing unit or a plurality of processing units for performing different actions of a method flow according to embodiments of the present disclosure.

In the RAM 1503, various programs and data required for the operation of the electronic device 1500 are stored. The processor 1501, the ROM 1502 and the RAM 1503 are connected to each other through a bus 1504. The processor 1501 performs various operations of the method flow according to embodiments of the present disclosure by executing the programs in the ROM 1502 and/or the RAM 1503. It should be noted that the programs may also be stored in one or more memories other than the ROM 1502 and the RAM 1503. The processor 1501 may also perform various operations of the method flow according to embodiments of the present disclosure by executing the programs stored in the one or more memories.

According to embodiments of the present disclosure, the electronic device 1500 may also include an input/output (I/O) interface 1505, and the input/output (I/O) interface 1505 is also connected to the bus 1504. The electronic device 1500 may also include one or more of the following components connected to the I/O interface 1505: an input portion 1506 including a keyboard, a mouse, etc.; an output portion 1507 including a cathode ray tube (CRT), a liquid crystal display (LCD), etc., and a speaker, etc.; a storage portion 1508 including a hard disk, etc.; and a communication portion 1509 including a network interface card such as a LAN card, a modem, etc. The communication portion 1509 performs communication processing via a network such as the Internet. A drive 1510 is also connected to the I/O interface 1505 as needed. A removable medium 1511, such as a magnetic disk, an optical disk, a magneto-optical disk, a semiconductor memory, etc., is mounted on the drive 1510 as needed so that a computer program read therefrom is installed into the storage portion 1508 as needed.

According to embodiments of the present disclosure, the method flow according to embodiments of the present disclosure may be implemented as a computer software program. For example, an embodiment of the present disclosure includes a computer program product including a computer program carried on a computer-readable medium, and the computer program contains program code for performing the method illustrated in the flowchart. In such an embodiment, the computer program may be downloaded from the network via the communication portion 1509 and installed, and/or installed from the removable medium 1511. The computer program, when executed by the processor 1501, performs the functions described above defined in the system of the embodiments of the present disclosure. According to embodiments of the present disclosure, the system, device, apparatus, module, unit, etc. described above may be implemented by the computer program module.

The present disclosure further provides a computer-readable medium. The computer-readable medium may be included in the device/apparatus/system described in the above-mentioned embodiments, and may also exist alone without being assembled into the device/apparatus/system. The computer-readable medium described above carries one or more programs, and when the one or more programs are executed, the method according to embodiments of the present disclosure may be implemented.

According to embodiments of the present disclosure, the computer-readable medium may be a nonvolatile computer-readable storage medium. The computer-readable storage medium may include, for example, but are not limited to, a portable computer disk, a hard disk, a random access memory (RAM), a read only memory (ROM), an erasable programmable read only memory (EPROM or flash memory), a portable compact disk read only memory (CD-ROM), an optical storage device, a magnetic storage device, or any suitable combination of the above. In the present disclosure, the computer-readable storage medium may be any tangible medium that contains or stores a program that may be used by or in conjunction with an instruction execution system, apparatus, or device. For example, according to embodiments of the present disclosure, the computer-readable medium may include one or more memories other than the ROM 1502 and/or the RAM 1503 and/or the ROM 1502 and the RAM 1503 described above.

Embodiments of the present disclosure further include a computer program product which includes a computer program. The computer program includes program code for implementing the method provided by embodiments of the present disclosure. When the computer program product runs on the electronic device, the program code is used to enable the electronic device to implement the image identification method provided by embodiments of the present disclosure.

When the computer program is executed by the processor 1501, the above-mentioned functions defined in the system/device of embodiments of the present disclosure are performed. According to embodiments of the present disclosure, the system, device, module, unit, etc. described above may be realized by the computer program module.

In an embodiment, the computer program may rely on a tangible storage media such as an optical storage device and a magnetic storage device. In another embodiment, the computer program may also be transmitted and distributed in a form of signals on a network media, downloaded through the communication section 1509 and installed, and/or installed from the removable medium 1511. The program code contained in the computer program may be transmitted by any appropriate network medium, including but not limited to: wireless, wired, etc., or any suitable combination of the above.

According to embodiments of the present disclosure, program codes for implementing the computer programs provided by embodiments of the present disclosure may be written in one programming language or any combination of more programming languages. Specifically, the computing programs may be implemented using advanced procedure-oriented and/or object-oriented programming languages, and/or assembler/machine languages. Programming languages include but are not limited to Java, C++, Python, "C" or similar programming languages. The program codes may be executed entirely on a user computing device, partially on a user device and partially on a remote computing device, or entirely on a remote computing device or server. In situations involving the remote computing device, the remote computing device may be connected to the user computing device through any kind of network, including a local area network (LAN) or a wide area network (WAN), or the user computing device may be connected to an external computing device (for example, using an Internet service provider to connect via the Internet).

The flowcharts and block diagrams in the drawings illustrate the architecture, functionality, and operation of possible implementations of systems, methods and computer program products according to various embodiments of the present disclosure. In this regard, each block in the flowcharts or block diagrams may represent a module, program segment, or portion of code, which contains one or more executable instructions for implementing the specified logical function. It should also be noted that, in some alternative implementations, the functions noted in the blocks may occur out of the order noted in the drawings. For example, two blocks shown in succession may, in fact, be executed substantially concurrently, or the two blocks may sometimes be executed in a reverse order, depending upon the functionality involved. It should also be noted that each block of the block diagrams or flowcharts, and combinations of the blocks in the block diagrams or flowcharts, may be implemented by using a special purpose hardware-based system that performs the specified functions or operations, or may be implemented using a combination of a special purpose hardware and computer instructions.

One or more of the above-described embodiments may have the following advantages or benefits: by combining the declaration information in a text form and the machine-detected radiation image, the cross-modal fusion device based on the attention mechanism may be used to fuse the image feature and the declaration information text feature, so that the intelligent inspection of clearance articles may be realized, and the inspection accuracy and inspection efficiency of the declaration information may be improved.

The embodiments of the present disclosure have been described above. However, these examples are for illustrative purposes only, and are not intended to limit the scope of the present disclosure. Although the various embodiments are described above separately, this does not mean that the measures in the various embodiments may not be advantageously used in combination. The scope of the present disclosure is defined by the appended claims and their equivalents. Without departing from the scope of the present disclosure, those skilled in the art may make various substitutions and modifications, and these substitutions and modifications should all fall within the scope of the present disclosure.

What is claimed is:

1. A method of verifying an authenticity of declaration information, comprising:
   acquiring a machine-detected radiation image obtained by scanning a container loaded with an article;
   acquiring a declaration information for declaring the article in the container;
   performing an identification on an image information of the article in the machine-detected radiation image to obtain an image feature corresponding to the machine-detected radiation image;
   performing an identification on a text information of the article in the declaration information to obtain a text feature corresponding to the declaration information, wherein the text feature is configured to represent a declaration category to which the article in the declaration information belongs;
   screening a declaration category of the article in the container by taking the image feature as an input information and the text feature as an external introduction feature; and
   determining that the declaration information is in doubt when a declaration category of at least one article in the container does not belong to a declaration category in the declaration information,
   wherein the text feature comprises text feature vectors corresponding to N2 articles in the declaration information, respectively, wherein N2 is an integer greater than or equal to 1,
   wherein the performing an identification on a text information of the article in the declaration information to obtain a text feature corresponding to the declaration information comprises:
   extracting a name information and a specification model information of each article in the declaration information;
   for each article, processing the name information into a first statement, and processing the specification model information into a second statement;
   determining the first statement and the second statement corresponding to a same article as an input of a text feature extraction projection module, and classifying the declaration category to which the article belongs using the text feature extraction projection module; and
   determining an output result of the text feature extraction projection module for each article category as the text feature vector corresponding to the article; wherein N2 text feature vectors are correspondingly obtained for N2 articles.

2. The method according to claim 1, wherein the image feature comprises N1 first image feature vectors corresponding to image information of N1 articles in the machine-detected radiation image, respectively, wherein N1 is an integer greater than or equal to 1.

3. The method according to claim 2, wherein the performing an identification on an image information of the article in the machine-detected radiation image to obtain an image feature corresponding to the machine-detected radiation image comprises:
   dividing different articles in the machine-detected radiation image into independent image blocks by using a target detection algorithm, to obtain N1 image blocks;
   extracting a second image feature vector corresponding to each of the image blocks; and
   obtaining, based on the second image feature vector corresponding to each of the image blocks, the first image feature vector corresponding to the image information of the article represented by the image block.

4. The method according to claim 3, wherein the extracting a second image feature vector corresponding to each of the image blocks comprises:
   performing an image identification on each of the image blocks by using an image feature extraction module, to obtain the second image feature vector corresponding to each of the image blocks,
   wherein the image feature extraction module comprises a convolution neural network.

5. The method according to claim 4, wherein the image feature extraction module comprises a network structure taking resnet as a basic network and adding SE-block after a resnet pooling layer.

6. The method according to claim 3, wherein the obtaining the first image feature vector corresponding to the image information of the article represented by the image block based on the second image feature vector corresponding to each of the image blocks comprises:
   acquiring a position information of each of the image blocks in the machine-detected radiation image; and
   obtaining the first image feature vector based on the second image feature vector and the position information corresponding to a same image block.

7. The method according to claim 6, wherein the obtaining the first image feature vector based on the second image feature vector and the position information corresponding to a same image block comprises:
   processing the second image feature vector using the position information of the image block;
   inputting the processed second image feature vector into an encoder; and
   obtaining an output of the encoder to obtain the first image feature vector corresponding to the image block.

8. The method according to claim 7, wherein the screening a declaration category of the article in the container by taking the image feature as an input information and the text feature as an external introduction feature comprises:
   screening the declaration category of the article in the container using a cross-modal decoder by taking the image feature as an input information of the cross-modal decoder and the text feature as an external introduction feature of an attention mechanism of the cross-modal decoder.

9. The method according to claim 8, wherein the encoder and the cross-modal decoder are jointly trained.

10. The method according to claim 9, wherein the encoder adopts a transformer encoder model.

11. The method according to claim 10, wherein the cross-modal decoder adopts a transformer decoder model.

12. The method according to claim 1, wherein the text feature extraction projection module adopts a BERT model.

13. A system of verifying an authenticity of declaration information, comprising:
   an information acquisition subsystem configured to acquire a machine-detected radiation image obtained by scanning a container loaded with an article, and acquire a declaration information for declaring the article in the container;
   a feature extraction subsystem configured to perform an identification on an image information of the article in the machine-detected radiation image to obtain an image feature corresponding to the machine-detected radiation image, and perform an identification on a text information of the article in the declaration information to obtain a text feature corresponding to the declaration information, wherein, the text feature is configured to represent a declaration category to which the article in the declaration information belongs;

a feature fusion subsystem configured to screen a declaration category of the article in the container by taking the image feature as an input information and the text feature as an external introduction feature; and a conclusion determination subsystem configured to determine that the declaration information is in doubt when a declaration category of at least one article in the container does not belong to a declaration category in the declaration information, wherein the text feature comprises text feature vectors corresponding to N2 articles in the declaration information, respectively, wherein N2 is an integer greater than or equal to 1, wherein the performing an identification on a text information of the article in the declaration information to obtain a text feature corresponding to the declaration information comprises:

extracting a name information and a specification model information of each article in the declaration information;

for each article, processing the name information into a first statement, and processing the specification model information into a second statement;

determining the first statement and the second statement corresponding to a same article as an input of a text feature extraction projection module, and classifying the declaration category to which the article belongs using the text feature extraction projection module; and determining an output result of the text feature extraction projection module for each article category as the text feature vector corresponding to the article; wherein N2 text feature vectors are correspondingly obtained for N2 articles.

14. An electronic device, comprising:
one or more memories storing executable instructions; and
one or more processors performing the executable instructions to implement a method, comprising:
acquiring a machine-detected radiation image obtained by scanning a container loaded with an article;
acquiring a declaration information for declaring the article in the container;
performing an identification on an image information of the article in the machine-detected radiation image to obtain an image feature corresponding to the machine-detected radiation image;
performing an identification on a text information of the article in the declaration information to obtain a text feature corresponding to the declaration information, wherein the text feature is configured to represent a declaration category to which the article in the declaration information belongs;
screening a declaration category of the article in the container by taking the image feature as an input information and the text feature as an external introduction feature; and
determining that the declaration information is in doubt when a declaration category of at least one article in the container does not belong to a declaration category in the declaration information,
wherein the text feature comprises text feature vectors corresponding to N2 articles in the declaration information, respectively, wherein N2 is an integer greater than or equal to 1,
wherein the performing an identification on a text information of the article in the declaration information to obtain a text feature corresponding to the declaration information comprises:
extracting a name information and a specification model information of each article in the declaration information;
for each article, processing the name information into a first statement, and processing the specification model information into a second statement;
determining the first statement and the second statement corresponding to a same article as an input of a text feature extraction projection module, and classifying the declaration category to which the article belongs using the text feature extraction projection module; and
determining an output result of the text feature extraction projection module for each article category as the text feature vector corresponding to the article; wherein N2 text feature vectors are correspondingly obtained for N2 articles.

15. A non-transitory computer readable storage medium having stored thereon executable instructions, wherein the instructions, when executed by a processor, cause the processor to perform a method, comprising:
acquiring a machine-detected radiation image obtained by scanning a container loaded with an article;
acquiring a declaration information for declaring the article in the container;
performing an identification on an image information of the article in the machine-detected radiation image to obtain an image feature corresponding to the machine-detected radiation image;
performing an identification on a text information of the article in the declaration information to obtain a text feature corresponding to the declaration information, wherein the text feature is configured to represent a declaration category to which the article in the declaration information belongs;
screening a declaration category of the article in the container by taking the image feature as an input information and the text feature as an external introduction feature; and
determining that the declaration information is in doubt when a declaration category of at least one article in the container does not belong to a declaration category in the declaration information,
wherein the text feature comprises text feature vectors corresponding to N2 articles in the declaration information, respectively, wherein N2 is an integer greater than or equal to 1,
wherein the performing an identification on a text information of the article in the declaration information to obtain a text feature corresponding to the declaration information comprises:
extracting a name information and a specification model information of each article in the declaration information;
for each article, processing the name information into a first statement, and processing the specification model information into a second statement;
determining the first statement and the second statement corresponding to a same article as an input of a text feature extraction projection module, and classifying the declaration category to which the article belongs using the text feature extraction projection module; and determining an output result of the text feature extraction projection module for each article category as the text feature vector corresponding to the article; wherein N2 text feature vectors are correspondingly obtained for N2 articles.

\* \* \* \* \*